JOHN S. CARROLL.
Improvement in Cotton-Hoes.
No. 115,568.  Patented June 6, 1871.
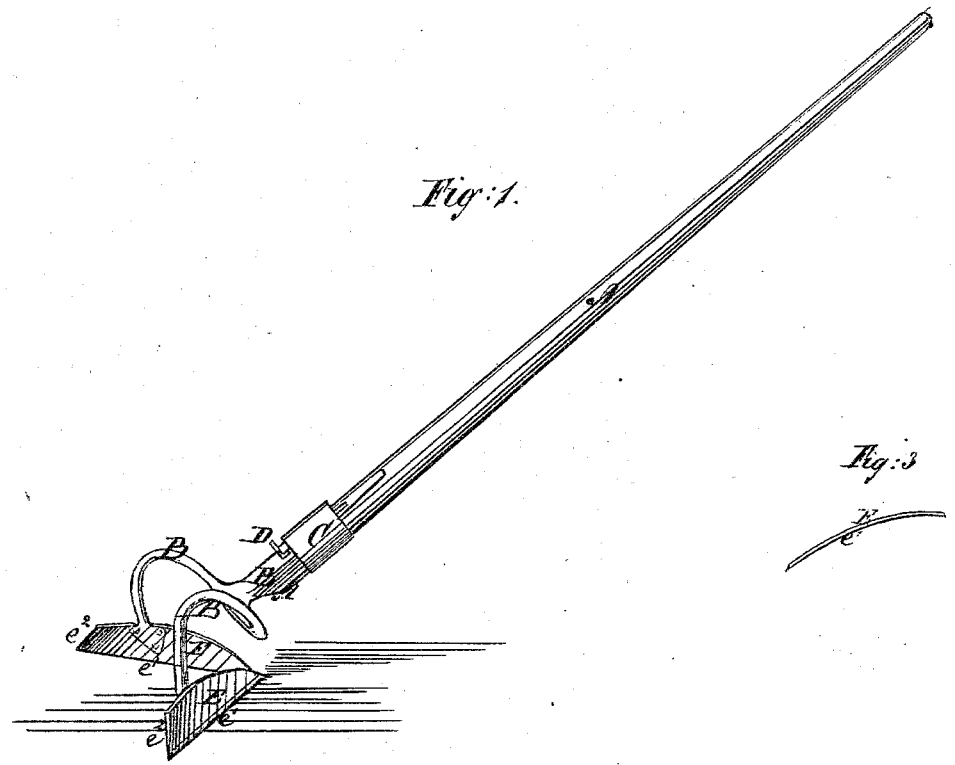
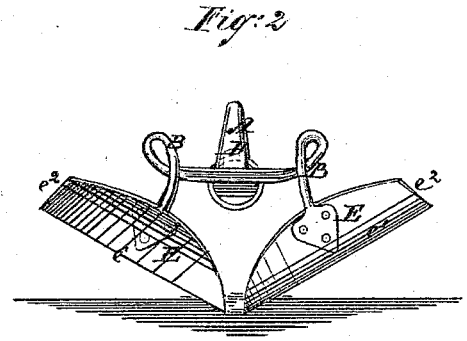
Witnesses:
C. Raettig.
Wm. H. C. Smith.
Inventor:
J. S. Carroll.
per
Attorneys.

UNITED STATES PATENT OFFICE.

JOHN S. CARROLL, OF COVINGTON, GEORGIA.

IMPROVEMENT IN COTTON-HOES.

Specification forming part of Letters Patent No. 115,568, dated June 6, 1871.

*To all whom it may concern:*

Be it known that I, JOHN S. CARROLL, of Covington, in the county of Newton and in the State of Georgia, have invented a new and useful Improvement in Cotton-Hoe; and I do hereby declare that the following is a full, clear, and exact description thereof, which will enable others skilled in the art to make and use the same, reference being had to the accompanying drawing forming part of this specification, in which—

Figure 1 is a perspective view of my improved cotton-hoe. Fig. 2 is a rear view of the same. Fig. 3 is a bottom or edge view of one of the hoe-plates.

Similar letters of reference indicate corresponding parts.

My invention has for its object to furnish an improved hand-hoe for cultivating cotton which shall be so constructed as to be much more convenient and effective in use than the hoes constructed in the ordinary manner, enabling the work to be done faster and better; and it consists in the construction and combination of the various parts of the hoe, as hereinafter more fully described.

A is the handle, the upper side of the lower end of which is grooved to receive the tang or upper part of the shank B. The upper end of the shank B is bent down and enters a recess in the handle. The shank B is secured to the handle A by a ring or band, C, which is slipped down upon the lower end of the handle A, over the upper end of the shank B, and is secured by a wedge, D, driven between the said band C, and the said shank B, as shown in Fig. 1. The shank B, a little below the end of the handle A, is divided into two branches, which branches are curved, as shown in Figs. 1 and 2, to bring their ends into proper position to receive the hoe-plates E. The hoe-plates or blades E are set at an angle, as shown in Figs. 1 and 2, their inner points being from one to two inches apart. The hoe-plates E are each made with two cutting-edges, $e^1$ $e^2$. The main edges $e^1$ are from 6 to 10 inches long, according to the size or number of the hoe. The end edges $e^2$ are to be from two to four inches long, according to the size or number of the hoe. The blades or plates E are curved from a point a little past the center to their outer ends. This curvature of the hoe-plates prevents the outer points from cutting too deeply into the ground in making the stroke. It also makes the hoe more convenient in separating and cutting out the young stalks, in removing grass from between and around the stalks, and in putting dirt around the said stalks.

This manner of cutting cotton to a stand and hoeing it has decided advantages over the old way of cutting between the stalks, for the reason that passing the hoe between the cotton-plants frequently, unless the greatest care be used, breaks and bruises the limbs of the plants.

With my improved hoe the strokes are made lengthwise of the rows, the blades reaching under the limbs of the plants, so as not to injure them, thus rendering so great care unnecessary.

Having thus described my invention, I claim as new and desire to secure by Letters Patent—

The two blades E E of a cotton-hoe, arranged at an angle to each other of about one hundred degrees, and having the long cutting-edges $e^1$ and short cutting-edges $e^2$ located as specified.

JOHN S. CARROLL.

Witnesses:
 HARRY CAMP,
 GILES S. WHITTON.